US000001477H

United States Statutory Invention Registration [19]

[11] Reg. Number: H1477

Payne

[43] Published: Sep. 5, 1995

[54] SYSTEM FOR CONTAINMENT AND HANDLING OF HAZARDOUS MATERIALS

[75] Inventor: Edward Payne, Annandale, Va.

[73] Assignee: The United States of America as represented by the Secretary of the Navy, Washington, D.C.

[21] Appl. No.: 229,475

[22] Filed: Apr. 18, 1994

[51] Int. Cl.[6] ..... B09B 3/00

[52] U.S. Cl. ..... 405/128

[58] Field of Search ..... 405/128, 129

[56] References Cited

U.S. PATENT DOCUMENTS 4,875,805 10/1989 Gross ..... 405/128

5,300,137 4/1994 Weyland et al. ..... 405/128

*Primary Examiner*—Charles T. Jordan

*Assistant Examiner*—Theresa M. Wesson

*Attorney, Agent, or Firm*—Melvin J. Sliwka; David S. Kalmbaugh

[57] ABSTRACT

A modular containment structure adapted for the storage and handling of hazardous materials which is a rectangular shaped box like structure with exterior walls, a floor, a roof and a door for access to an internal portion of the structure. Included in the internal portion of the modular containment structure are modular shelving units for storage of the hazardous materials and a computer for maintaining an inventory of the materials stored within the structure.

5 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SYSTEM FOR CONTAINMENT AND HANDLING OF HAZARDOUS MATERIALS

BACKGROUND OF THE INVENTION

1. Field of the Invention

This invention relates generally to the handling of hazardous wastes and other hazardous materials. More specifically, the present invention is concerned with a new form of containment unit for handling, storing and transporting hazardous materials.

2. Description of the Prior Art

The handling, storage and transport of hazardous materials, and particularly hazardous waste has become a problem of major proportions. Increased emphasis is being placed on the importance of assuring that solvents, lubricants, paint related products, and the like are stored with adequate safeguards. Increasingly, it is being recognized that even small spills and relatively minor leakages of the growing number of substances that are being referred to by the term "hazardous material" can detrimentally affect persons, property, plants, animals, ground water and other aspects of ecology and the environment. Moreover, in view of increasing concern about the lasting nature of the adverse effects that can result from spills and unchecked leakage of hazardous materials, the issue of transportation and storage of hazardous materials is receiving increasing attention by law-makers, by regulatory agencies, and by those Who have been elected to govern and to enforce the laws and regulations relating to hazardous materials.

In the past, the standard form of container for the handling, storage and transportation of hazardous materials has been the 55 gallon steel drum. In transportation of hazardous materials using 55 gallon steel drums, the drums are easily ruptured if an accident occurs. A high impact against a gang of the drums in a truck accident, for example, can cause a sort of domino effect wherein sufficient impact is transferred to a great number of the drums to rupture the drums. This is due to the basic cylindrical shape of the drum as well as its relatively thin walled construction.

During transportation and storage of the drums another hazard which may occur when full drums are stacked which they frequently are because their shape clearly lends itself to stacking. In many instances the drums are stacked eight or nine tiers high. These drums often leak, with the leaking chemicals flowing down to mix with other chemicals below. In this situation, even if the individual chemicals are not in themselves particularly hazardous, an unknown and hazardous combination may result.

When using cylindrical drums there is another potential hazard in that the drums are inherently reusable, even if the drums are not intended for this purpose. Unwitting re-use with an incompatible chemical can cause an explosion or the creation of a dangerous, explosive, poisonous or otherwise hazardous combination. The inherent re-usability of cylindrical drums is a significant disadvantage. Cylindrical drums with explosive materials have been known to ignite and shoot through a building roof in the manner of a rocket. Explosive material can dry and harden from the outside in toward the center of the drum, leaving a hollow core which can act as a rocket nozzle. This is another inherent disadvantage in using cylindrical drums for the storage of explosive hazardous materials.

For these and other reasons, there remains a very genuine and real need for a well designed, heavy duty containment facility that appropriately will address today's increasing concern for the way in which hazardous materials are handled, transported and stored.

SUMMARY OF THE INVENTION

The structure of the present invention addresses the foregoing and other needs of hazardous material storage, handling and transportation by providing an environmentally safe modular storage unit which will provide a good service life and under circumstances of reasonable use, can be moved from site to site over the years as may be appropriate to address a series of different servicing needs.

In the preferred practice, the modular hazardous material containment structure comprises a generally rectangular box like frame which includes a base or floor having side supporting walls mounted thereon and extending upward and a roof secured to the top of the side supporting walls. Positioned at one end of the containment of the structure is a door which allows a user of the structure access to the internal portion of the structure. The internal portion structure includes modular shelving units for storing the hazardous materials and a computer work station which allows the user to inventory the hazardous materials. Heating and cooling for the internal portion of the modular hazardous material containment structure is provided by an air conditioner/heat pump.

There is also provided with the modular hazardous material containment structure removable wheels and a removable tow bar which when attached to the structure allows a tow truck or the like to move the structure within a hazardous material storage facility.

The above and other advantages and features of the present invention will be more fully understood on reference to the preferred embodiment thereof and to all the figures of the drawings.

DETAILED DESCRIPTION OF THE PREFERRED EMBODIMENTS

Figure 1:
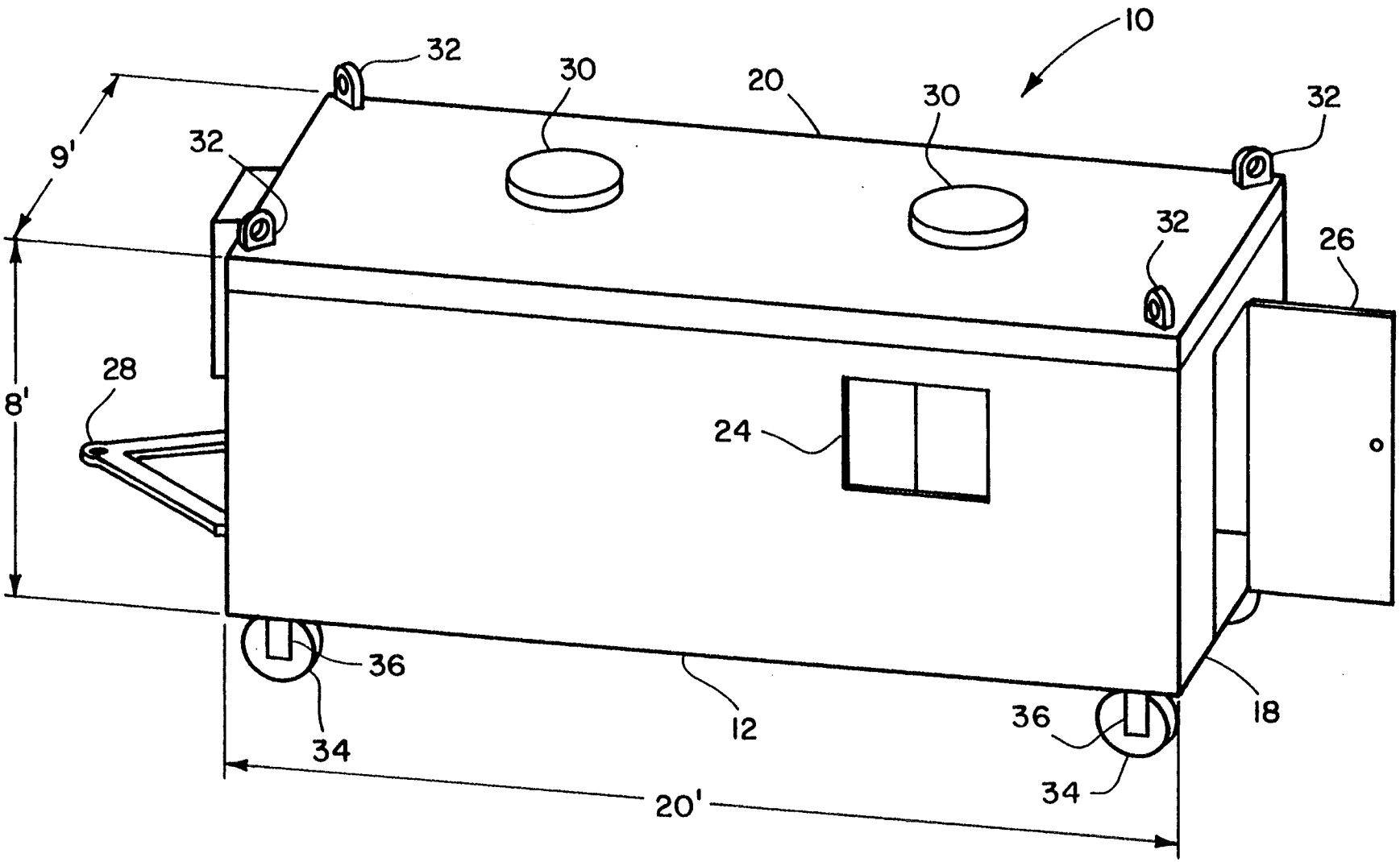
FIG. 1 is a perspective, front elevation view of the modular hazardous material containment structure constituting the present invention.
Figure 2:
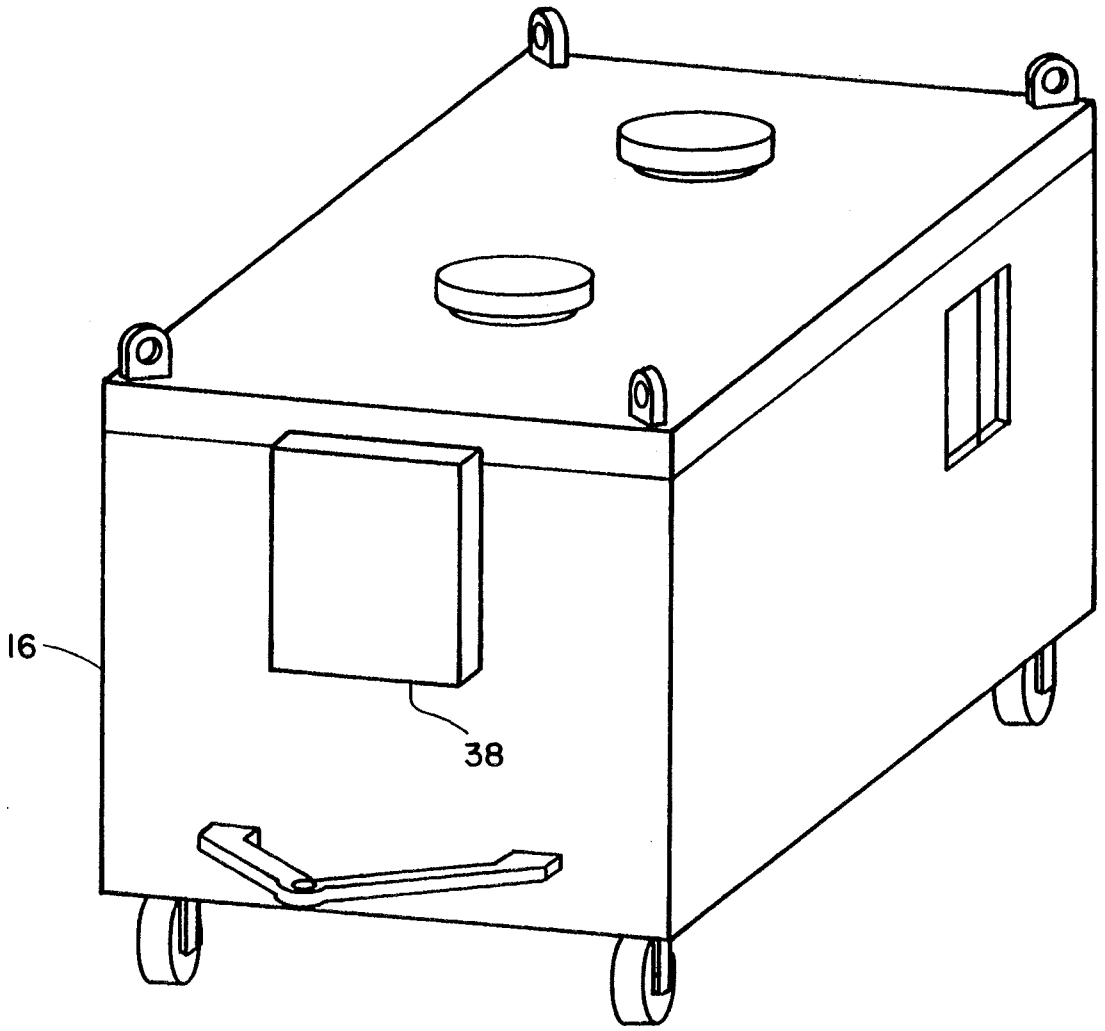
FIG. 2 is a perspective, side elevation view of the modular hazardous material containment structure.
Figure 3:
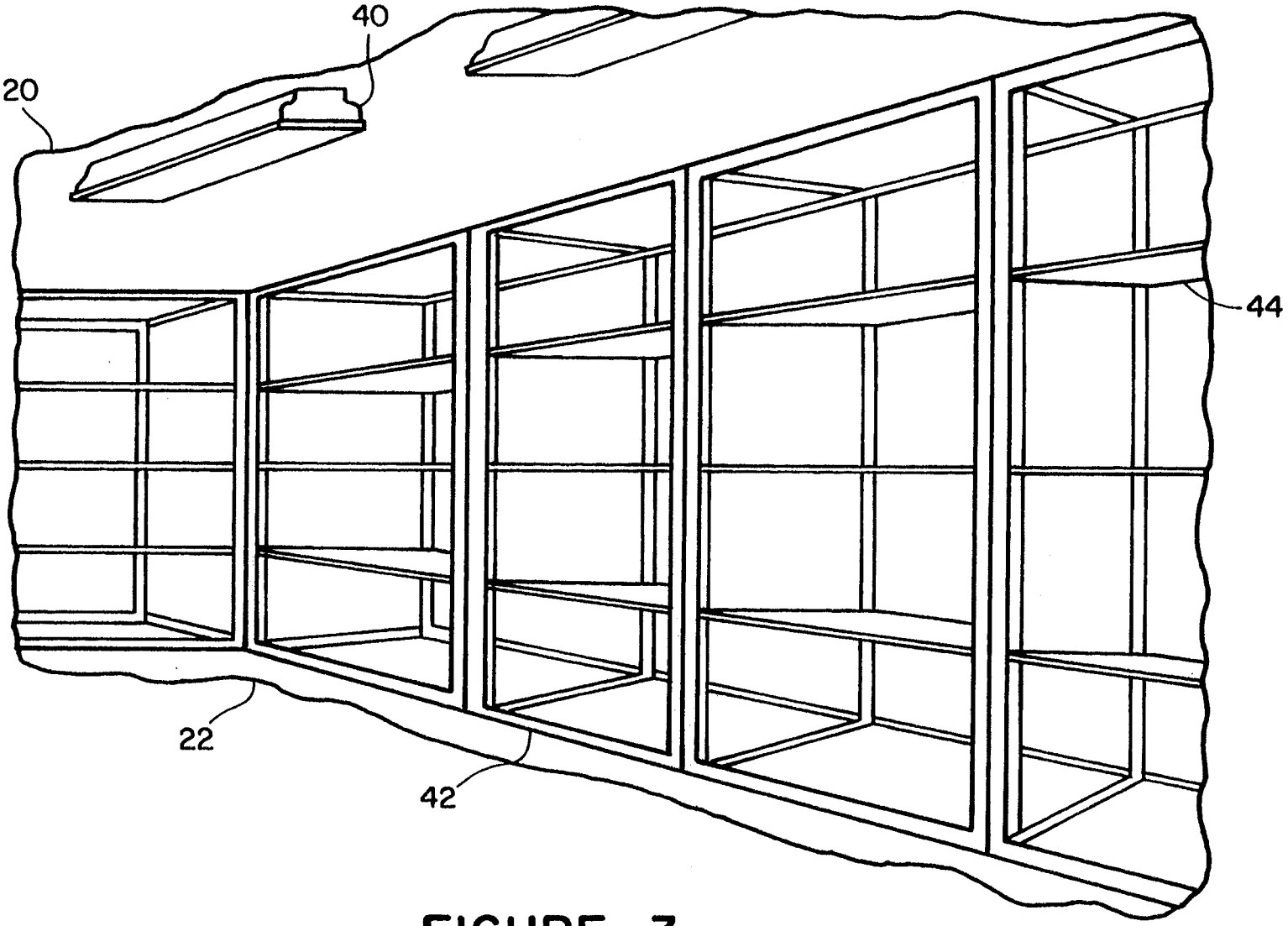
FIG. 3 is a view cut away to partially illustrate the internal structure of the modular hazardous material containment structure.

Referring now to the drawings wherein the showings are for the purpose of illustrating the preferred embodiments of the invention only and not for the purpose of limiting the same, FIGS. 1, 2 and 3, illustrate a modular hazardous material containment structure, designated by the reference numeral 10 which is suitable for storing flammable, explosive, toxic and other hazardous materials. Modular hazardous material containment structure 10 includes a generally rectangular box like frame which includes a base or floor 22 with side supporting walls 12, 14, 16 and 18 mounted thereon and extending upward. Side supporting walls 12, 14, 16 and 18 are attached to the edges of floor 22 by welds, not shown. Each of the side supporting walls 12, 14, 16 or 18 is, in turn, secured to an adjacent supporting wall by welds, not shown. Corner braces may also be used for additional support at each location where one side supporting walls 12, 14, 16 or 18 is secured to its adjacent supporting wall.

A roof 20 is mounted on the top portion of the side supporting walls 12, 14, 16 and 18 and is rectangular in shape. Side supporting walls 12, 14, 16 and 18 are also attached to the edges of roof 20 by welds, not shown.

As is best illustrated in FIG. 1 the hazardous material containment structure 10 has dimensions of approximately twenty feet in length, nine feet in width and a height of about eight feet. The structure 10 may be fabricated from steel which is generally corrosion resistant and explosion proof and which may be, for example, nickel-bearing chromium stainless steel, or the like.

Figure 4:
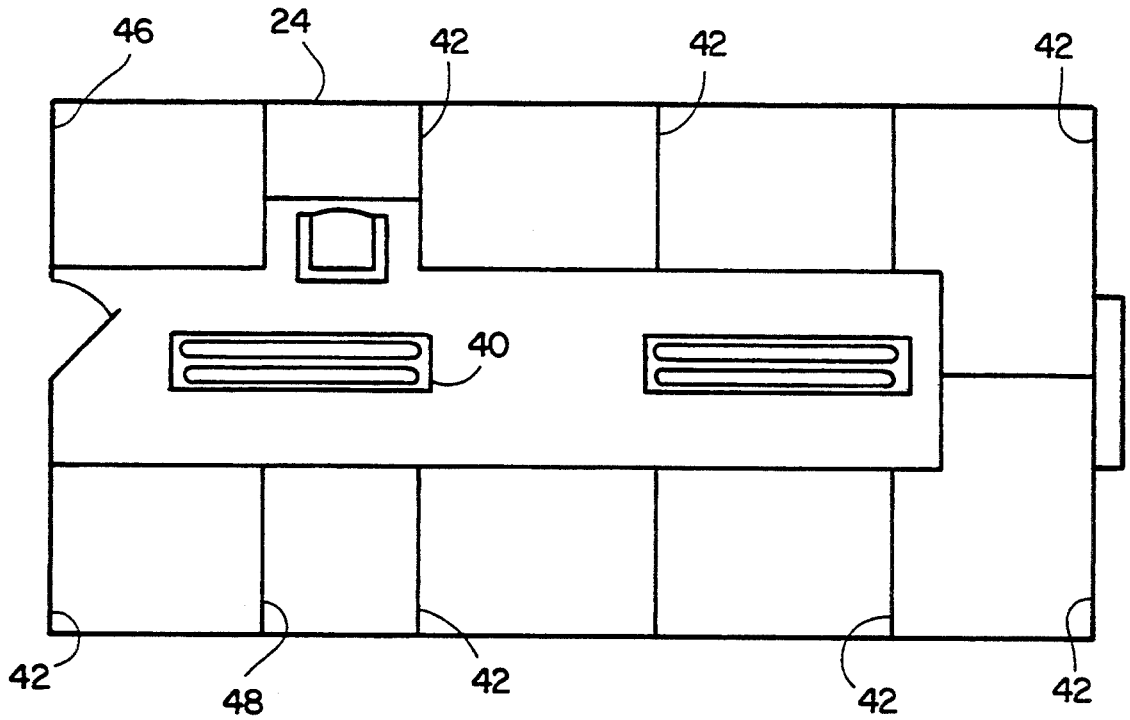
FIG. 4 is a schematic diagram illustrating the internal layout of the modular hazardous material containment structure.

A side 18 of modular hazardous material containment structure 10 includes a door 26 preferably attached to structure 10 by hinges, not illustrated. Door 26, in turn, allows a user of structure 10 access to the inner portion of structure 10 which is illustrated in FIGS. 3 and 4. Preferably only one door per modular hazardous material containment structure 10 is provided, although it is within the scope of the invention to add additional doors if it is desired. It should be noted that the door may be fabricated from a corrosion resistant steel of the type utilized to fabricate the structure 10.

Side supporting wall 12 of structure 10 includes a window 24 (illustrated in FIG. 1) which is fabricated from commercially available bullet proof glass. Again preferably only one window per modular hazardous material containment structure 10 is provided, although it should be understood that it is within the scope of the invention to add additional windows if it is desired.

As is best illustrated in FIG. 1, the roof 20 of structure includes a pair of air vents 30 mounted therein. Air vents 30 are provided to allow for the monitoring and removal of gasses which may collect inside the interior portion or chamber of modular hazardous material containment structure 10 and which may be hazardous to the user of the interior portion of structure 10. The air vents may be adapted for use with a gas collection and treatment system (not illustrated) should the gases be considered harmful to the environment. Such a collection and treatment is well known in the art.

Roof 20 also includes four lifting rings 32 mounted to the top portion of roof 20 at each corner structure 10. Lifting rings 32, for example, allow a hoist or crane to remove structure 10 from or place structure 10 the cargo hold 56 (illustrated in FIG. 6) of an ocean going vessel.

There is attached to the front portion of modular hazardous material containment structure 10 a removable tow bar 28 which is secured to side supporting wall 16 by mounting bolts, not shown. Structure 10 also has attached to its floor at each corner wheel jacks 36 upon which are rotatably mounted removable wheels 34. When structure 10 is, for example, being utilized in a warehouse containing hazardous materials and it is not practical to a hoist or crane to move structure 10, a tow truck may be used to move structure 10 within the warehouse by attaching tow bar 28 and wheels 34 to structure 10 and then securing tow bar 28 to the tow truck.

There is also mounted on the front portion of structure 10 a combination heat pump/air conditioner 38 which is used to maintain the internal temperature of structure 10 at temperature which is comfortable for the user of structure 10 while not allowing for an adverse chemical reaction of the hazardous materials stored within structure 10 which may injure the user of structure 10.

It should be noted that heat pump/air conditioner 38 allows for the use of modular hazardous material containment structure 10 in adverse climates such as a desert or an antarctic type climate.

Referring to FIG. 3, there is shown the internal structure of structure 10 which has therein a plurality of heavy duty modular shelving units 42 with each shelving unit 42 having a plurality of shelves 44. The modular shelving units 42 allow for the housing and storage of containers of hazardous materials such as cans of paint, drums of lubricants and the like. Heavy duty modular shelving units 42 are, in turn, secured to floor 22 by used of mounting bolts, not shown.

At this time it should be noted that the heavy duty modular shelving units 42 used in the preferred embodiment of the present invention are manufactured by Shields Manufacturing Company of Oxnard, California and are designated as Model MRC-1007 Seismic Secondary Containment Shelves. It should be understood, however, that any shelving units which allow for the safe storage of hazardous materials may be used as modular shelving units 42 within the present invention.

Modular hazardous material containment structure 10 also has in its interior a plurality of explosion proof lighting units or ceiling fixtures 40 attached to its roof/-ceiling 20. Ceiling fixtures, in turn, provide interior lighting for the user of structure 10. The lighting units used in the preferred embodiment of the present invention are an explosion proof fluorescent lighting unit commercially available from Shields Manufacturing Company. Again, any commercially available explosion proof lighting unit may be used as ceiling fixtures 40.

Referring now to FIG. 4, there is shown a layout of the interior of the modular hazardous material containment structure 10. The layout illustrates the position of the various components of modular hazardous material containment structure 10 which may be utilized by the user of structure 10 to assist him in his management of the hazardous materials stored within structure 10. For example, modular hazardous material containment structure 10 includes a computer work station 46 having a computer for maintaining an inventory of the hazardous materials stored within structure 10, the date the material was first stored in structure 10, the location of each hazardous material stored within structure 10 and other information which is pertinent to storing hazardous materials within structure 10. It should be understood that any well known and commercially available computer software program may be used within the computer of work station 46 to maintain the inventory of hazardous materials stored within structure 10.

Modular hazardous material containment structure 10 also includes the heavy duty modular shelving units 42 for the storage of hazardous materials and an explosion proof refrigerator 48 which may be used for the storage of hazardous materials which are volatile at higher temperatures. The explosion proof refrigerator used in the preferred embodiment of the present invention is commercially available from Shields Manufacturing Company and is designated as Model MRC-1003 Explosion Proof Refrigerator.

Figure 5:
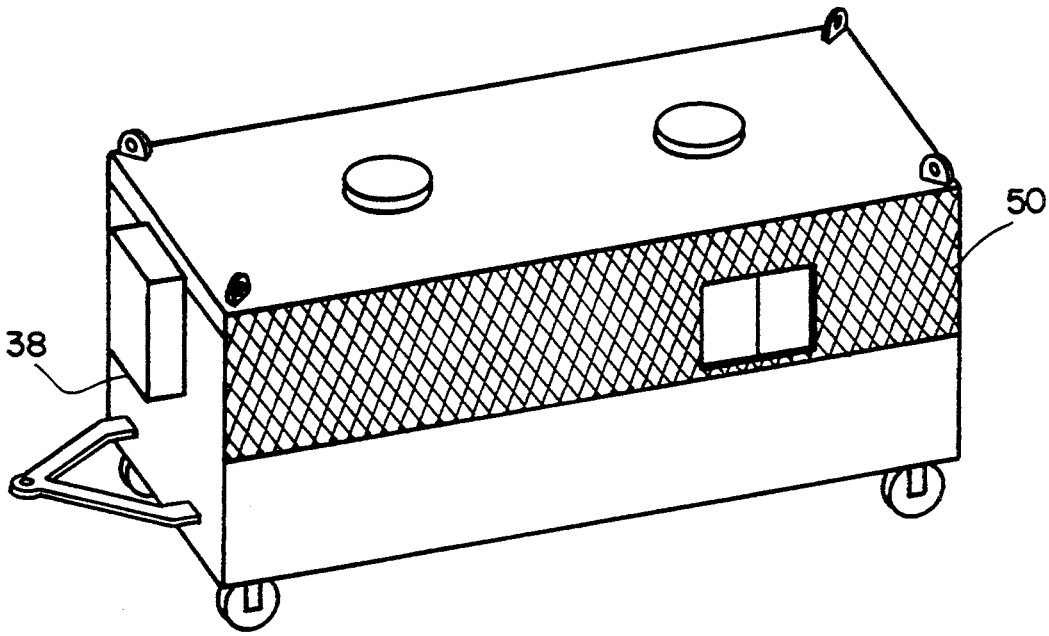
FIG. 5 is a perspective, front elevation view illustrating another embodiment of the present invention.

Referring now to FIG. 5, there is shown an alternative embodiment of the modular hazardous material containment structure 10 which has on the upper portion of supporting side wall 12, FIG. 1, a meshed ventilation screen 50 which allows air flow throughout the interior of structure 10 to ventilate the interior of structure 10.

Figure 6:
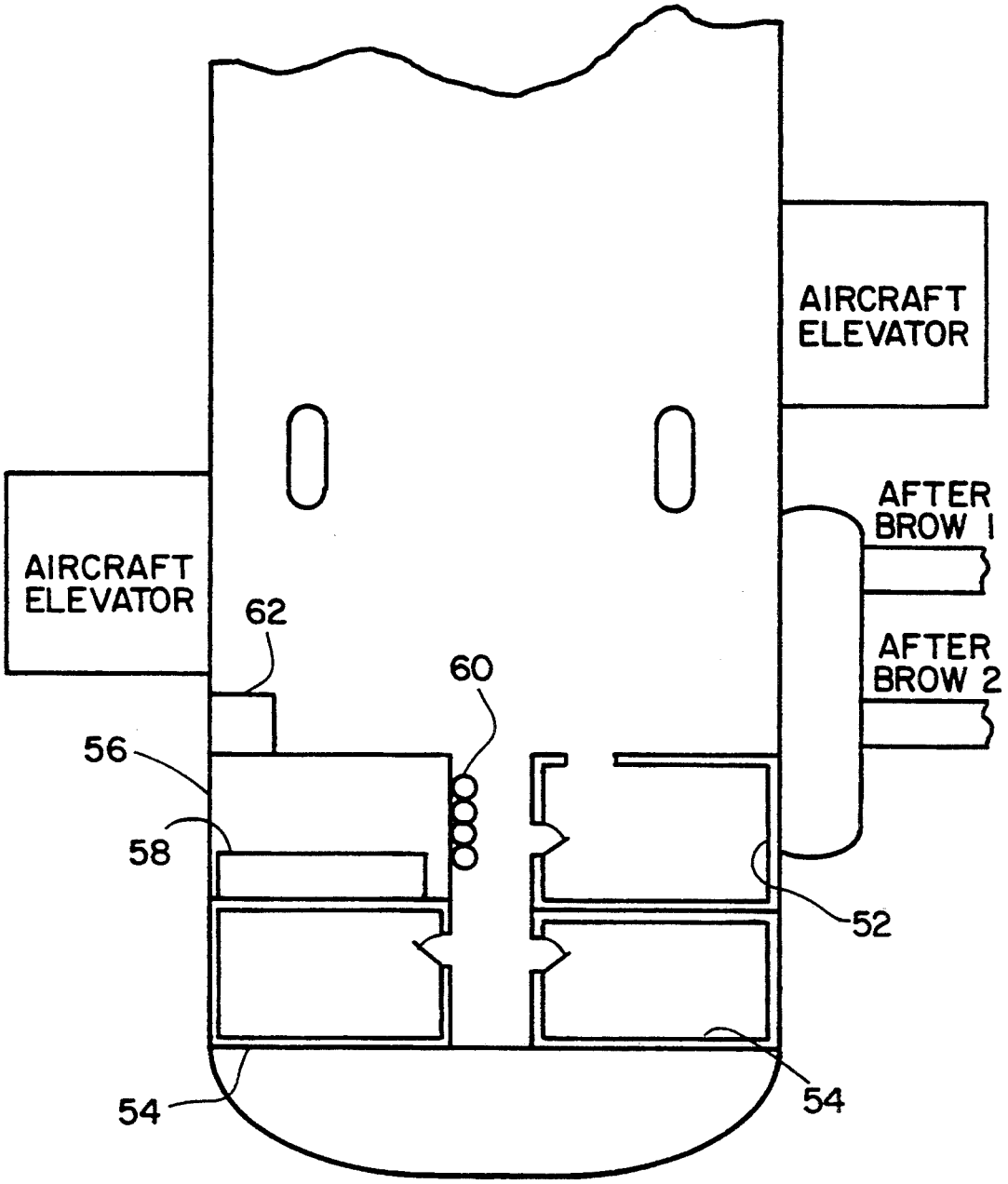
FIG. 6 illustrates the placement of the modular hazardous material containment structure in the cargo area of an ocean going vessel.

Referring now to FIG. 6, there is shown the cargo hold 56 of an ocean going vessel which has therein the modular hazardous material containment structure constituting the present invention which is designated by the reference numeral 52. There is also included in cargo hold 56 a maintenance shop 54, a storage area 58, an accumulation area 56, recyclable material collection containers 60 for storing the hazardous materials and a bale crusher 62. Each of these areas within cargo hold 56 and the equipment including structure 10 are utilized to provide an efficient and very effective system for the handling, storage and transportation of hazardous materials aboard an ocean going vessel.

From the foregoing, it may be seen that the present invention comprises a new, unique and exceedingly useful hazardous material storage apparatus which constitutes a considerable improvement over the known prior art. Obviously many modifications and variations of the present invention are possible in light of the above teachings. It is, therefore, to be understood that within the scope of the appended claims the invention may be practiced otherwise than as specifically described.

What is claimed is:

1. A modular containment structure for the storage and containment of hazardous materials, said modular containment structure comprising:

a generally rectangular, box like structure having a base and four side supporting walls mounted upon said base, said four side supporting walls extending upward from said base;

a roof mounted on a top portion of said four side supporting walls, said roof being mounted on said four side supporting walls to form an interior chamber in conjunction with said four side supporting walls and said base;

a door mounted within a first of said four side supporting walls, said door being mounted so as to open and allow access to said interior chamber from an external environment;

a plurality of modular shelving units located within said interior chamber of said modular containment structure, each of said modular shelving units being mounted on an upper surface of said base of said modular containment structure;

computer means located within said interior chamber of said modular containment structure, said computer means maintaining an inventory of said hazardous materials stored within said modular containment structure;

a pair of air vents mounted within the roof of said modular containment structure, said air vents allowing for the monitoring and removal of gasses which collect in said interior chamber of said modular containment structure; and heat pump means mounted within a second of said four side supporting walls for maintaining a uniform temperature within said interior chamber of said modular containment structure.

2. The modular containment structure of claim 1 further comprising:

four wheels attached to a lower surface of said base of said modular containment structure, each of said wheels being positioned near a corner of said base; and a tow bar attached to the second of said four side supporting walls, said tow bar being adapted for connection to a tow truck to allow said tow truck to move said modular containment structure from a first location to a second location.

3. The modular containment structure of claim 1 further comprising four lift rings attached to an upper surface of said roof of said modular containment structure, each of said lift rings being positioned near a corner of said roof.

4. The modular containment structure of claim 1 further comprising a plurality of light fixtures mounted upon a lower surface of said roof.

5. The modular containment structure of claim 1 further comprising a refrigerator positioned within said interior chamber of said modular containment structure.

* * * * *